United States Patent
Endo et al.

(10) Patent No.: US 6,205,502 B1
(45) Date of Patent: Mar. 20, 2001

(54) UNIVERSAL SERIAL BUS COMPATIBLE PERIPHERAL DEVICE AND UNIVERSAL SERIAL BUS CONTROLLER WHICH AUTOMATICALLY SWITCHES BETWEEN CONNECTION AND DISCONNECTION OF COMPUTER

(75) Inventors: Yoshihisa Endo; Shinichi Higuchi; Kazuhito Ooshita; Yuko Sonoda; Kouichi Ogino, all of Fukushima-ken (JP)

(73) Assignee: Alps Electric Co., Ltd., Tolyo (JP)

( * ) Notice: Subject to any disclaimer, the term of this patent is extended or adjusted under 35 U.S.C. 154(b) by 0 days.

(21) Appl. No.: 09/215,088

(22) Filed: Dec. 18, 1998

(30) Foreign Application Priority Data

Jan. 6, 1998 (JP) .................................................. 10-000826

(51) Int. Cl.⁷ ..................................................... G06F 13/00
(52) U.S. Cl. ........................................... 710/100; 710/131
(58) Field of Search ..................................... 710/102, 103, 710/100, 101, 126, 2, 62, 63, 8, 104, 129, 131; 713/1, 100; 709/301; 717/11

(56) References Cited

U.S. PATENT DOCUMENTS 5,625,238 * 4/1997 Ady et al. .
6,003,097 * 12/1999 Richman et al. .
6,058,441 * 5/2000 Shu .

* cited by examiner

*Primary Examiner*—Gopal C. Ray
(74) *Attorney, Agent, or Firm*—Brinks Hofer Gilson & Lione

(57) ABSTRACT

A USB controller is provided between a personal computer main unit and various devices. By providing the USB controller with a switch part for temporarily cutting a current flowing between the USB controller and the personal computer main unit, the circuit is connected or interrupted. With the configuration, when a new device is connected, by sequentially turning on and off a switch in the switch part, an operation similar to pull-out and insertion of a connector or resetting of a system can be executed, so that the newly connected device can be made usable immediately.

6 Claims, 2 Drawing Sheets

UNIVERSAL SERIAL BUS COMPATIBLE PERIPHERAL DEVICE AND UNIVERSAL SERIAL BUS CONTROLLER WHICH AUTOMATICALLY SWITCHES BETWEEN CONNECTION AND DISCONNECTION OF COMPUTER

BACKGROUND OF THE INVENTION

1. Field of the Invention

The present invention relates to a USB controller used for connecting a peripheral device according to the USB standard to a computer. More particularly, the invention relates to a USB controller which eliminates time and effort to make a peripheral device usable.

2. Description of the Related Art

Recently, a novel standard called a USB (Universal Serial Bus) adapted to a personal computer has made its appearance. In compliance with the novel standard, connectors of the same shape of various peripheral devices such as a keyboard, a mouse, and a game pad are formed. The peripheral devices are used by connecting the connectors to USB ports of a personal computer. Peripheral devices adapted to the USB standard have also come to be distributed in the market.

The USB port has therein four pins of a pin for a D+ data line, a pin for a D− dataline, a pin for power supply, and a pin for the ground. Either the D+ or D− pin is used and is pulled up (switched on), thereby recognizing connection of a device (peripheral device). By making either the D+ or D− pin pulled down (switched off), it is recognized that the device is not connected.

Although usually about two of the same USB ports are provided for a single personal computer, when three or more peripheral devices adapted to the USB are connected, the number of ports are short for the connectors.

In order to cope with the case, a device called a USB hub (not shown) in which a plurality of USB ports having the same shape as that of the USB port formed on the personal computer side are formed has developed. By inserting the device into the USB port on the personal computer side, a plurality of peripheral devices can be connected to the single USB port on the personal computer side.

In case of connecting peripheral devices to the USB ports formed in the main unit of a personal computer, however, whenever a peripheral device is added or eliminated, the peripheral device cannot be used unless the user performs an operation for pulling out the USB connector of the peripheral device connected to the USB port of the personal computer and then re-inserting the USB connector, thereby allowing the newly connected peripheral device to be re-recognized.

When the USB port is formed on the rear side of the personal computer, the user has to go to the rear side of the personal computer and pull out and insert the USB connector, so it is very troublesome.

That is, when the peripheral device is added or disconnected, by pulling down the D+ pin (or D− pin) in the USB port which has been pulled up and again pulling it up, information of each peripheral device connected at the time point when the D+ pin is pulled up again is transmitted to the personal computer side through a data line, so that the connecting state of the peripheral devices can be re-recognized.

On the other hand, in case of not performing the pull-out and insertion of the USB connector, a method of re-recognizing devices by resetting the system on the personal computer side can be employed. In this case, however, there is a problem that it takes time to make the personal computer operable again and the operation is troublesome. When the system is reset, inconveniences such that presently used application software has to be finished are caused.

The USB hub simply increases the number of devices which can be connected. Even if the USB hub is used, in a manner similar to the case where the USB hub is not used, there is a drawback that the USB connector has to be pulled out and inserted or the system has to be reset when the peripheral device is added or eliminated.

Especially, when the peripheral device is wireless, since there is no cable, it has an advantage of easy handling. In this case as well, however, the connector has to be pulled out and inserted for re-recognition of the peripheral devices, so that further improvement in the operability utilizing the advantage of being wireless of the device cannot be expected.

SUMMARY OF THE INVENTION

It is an object of the invention to solve the problems and to provide a USB controller which can automatically re-recognize a peripheral device without resetting of a system or pulling-out and insertion of a connector.

A USB controller of the invention is connected to a computer via a USB port and can transmit and receive data to/from the computer and various devices. Each time a new device is added or an existing device is eliminated, the connecting state of the devices can be automatically re-recognized.

Addition or elimination of various devices can be recognized by the controller itself, and an operation which corresponds to an operation of pulling out and inserting a connector or the like is automatically performed without pulling out and inserting a connector or resetting the system. After that, information of the addition or elimination of the device is transmitted to the computer side, thereby enabling the new device to be used or an unnecessary device to be eliminated.

In this case, by providing a switch in the controller and switching the switch to make the device re-recognized, the newly connected device can be made usable immediately.

The switch can be provided at an arbitrary position in a data line connecting the computer and the controller. In this case, the data line is interrupted by turning off the switch and is connected by turning on the switch, so that an operation replaced by the pull-out and insertion of a connector or resetting of the computer is performed to the computer side and the connecting state of the devices is updated.

It is also possible that an earthing part is provided at some midpoint in a data line connecting the computer and the controller and a switch can be provided for the earthing part. In this case, by turning on the switch, a current flowing in the data line flows to the earthing part, a state similar to the pull-out and insertion of a connector or resetting of the computer is obtained, and the connecting state is updated to that after addition or elimination of a device.

As mentioned above, when a new device is recognized by the controller, information of both of a device already connected and a newly connected device is transmitted to the computer side, the connecting state is updated, and the new device can be made usable immediately. In case of eliminating an existing device as well, for example, after elapse of a predetermined time, the controller recognizes the elimination of the device and the device is updated.

The USB controller of the invention is connected to a port according to the USB standard provided for the main unit of a computer, transmits and receives data to/from a plurality of various devices wirelessly, controls data from each of the devices and transmits the data to the computer main unit. The USB controller comprises: a receiving unit for receiving signals from the devices; a transmitting unit for transmitting a confirmation signal; and a control unit for controlling the receiving unit and the transmitting unit, and connection or interruption to/from the computer main unit is automatically switched in accordance with the presence or absence of the added device or an eliminated device on the basis of the confirmation signal.

In this case, the control unit determines identification data of the added device and transmits the identification data to the computer main unit. The computer main unit can select the device by the identification data.

By the above means, when a new wireless device is arranged in a predetermined position and is added, the device receives a confirmation signal from the transmitting unit, a response to the reception is sent from the device to the receiving unit of the USB controller, and the control unit confirms that the new device is connected. Subsequently, initialization is carried out by interrupting the connection between the USB controller and the computer main unit and connecting them again, data regarding the connected various devices can be collected and is transmitted to the computer main unit.

As mentioned above, by providing the switch and automatically updating the connecting state of peripheral devices, the effect is displayed especially in case of a wireless device. For example, in order to assure the space on a desk, a device is usually stored in another place and is taken out and arranged in a predetermined position when it is necessary to be used. Only by the arrangement, the new device is immediately recognized and can be made usable.

DETAILED DESCRIPTION OF THE PREFERRED EMBODIMENTS

A USB controller of the invention will be described hereinbelow with reference to the drawings.

Figure 1:
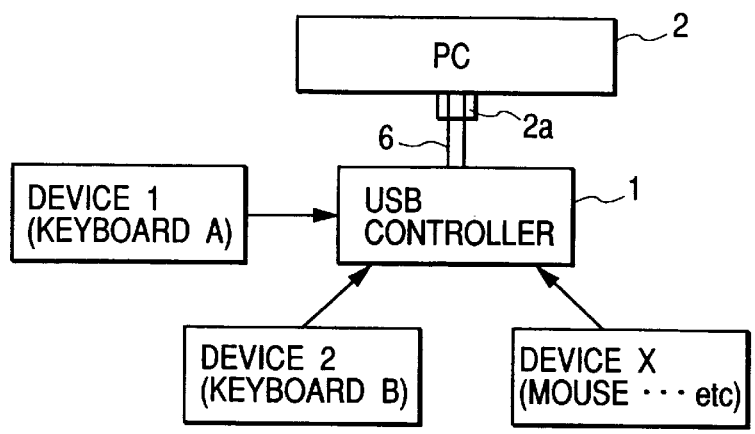
FIG. 1 is a block diagram showing a connecting state of a USB controller of the invention and a peripheral device.
Figure 2:
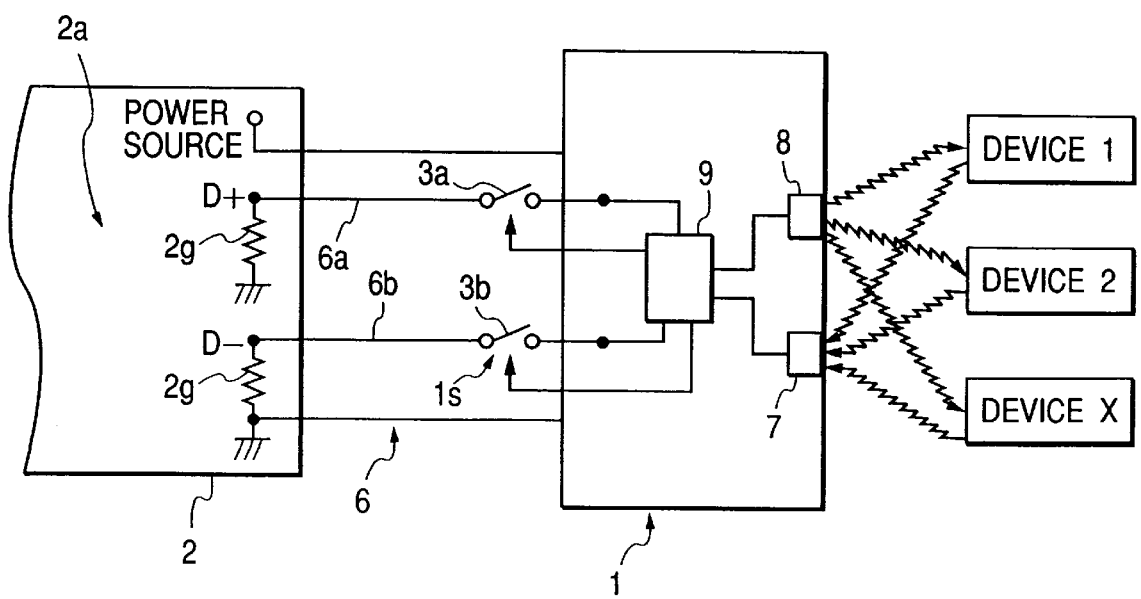
FIG. 2 is a circuit diagram showing the USB controller.
Figure 3:
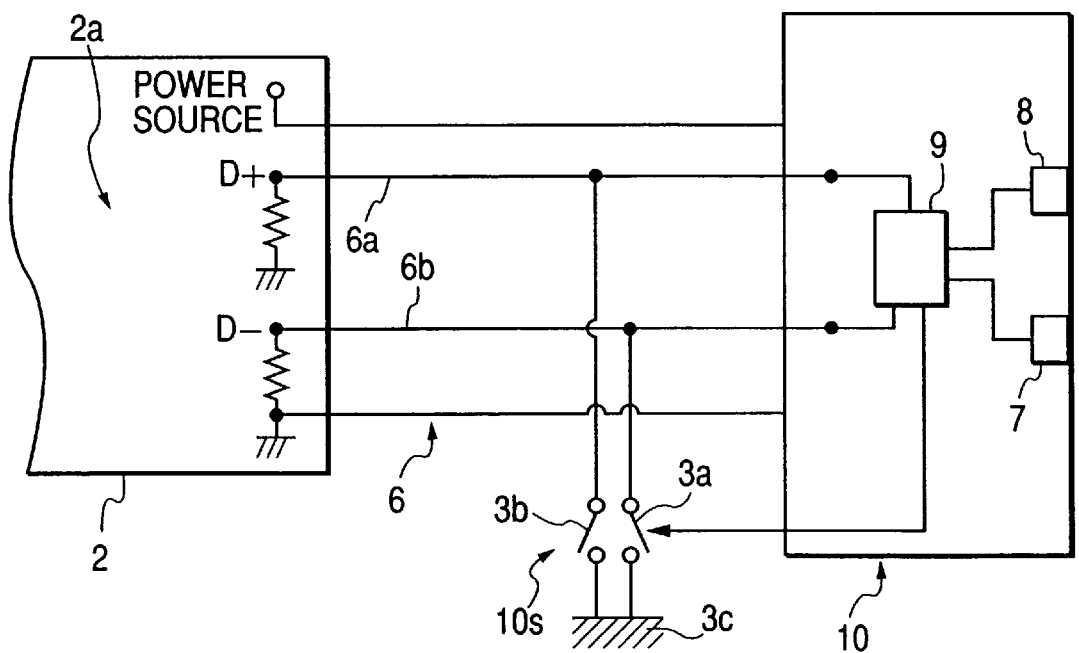
FIG. 3 is a circuit diagram showing a modification of the USB controller.

FIG. 1 is a block diagram showing a connecting state of a USB controller 1 and its peripheral connecting device. FIG. 2 is a circuit diagram of a part around a switch. FIG. 3 is a modification of the USB controller.

The main unit 2 of a personal computer (PC) is connected to the USB controller 1 shown in FIG. 1 via an interface cable 6 for USB and various wireless devices (peripheral devices) such as a keyboard A (device 1), keyboard B (device 2) and a mouse (device X) are also connected to the USB controller 1. A receiving unit (not shown) for receiving data from the various wireless devices is provided on the USB controller 1 side. Data is transmitted and received by using mainly infrared rays or electric waves.

The personal computer main unit 2 is provided with a USB port 2a. A USB connector extending from the USB controller 1 is connected to the USB port 2a. As shown in FIG. 2, the USB port 2a is constructed by four pins for D+, D−, grounds 2g, 2g, and a power source. The D+ pin and the D− pin are used for data lines for transmitting and receiving data. When no device is connected to the personal computer main unit 2, the data lines are connected to the grounds 2g, 2g.

The USB controller 1 is provided with a receiving unit 7 for receiving infrared rays or electric waves from various devices and allocation to each device is carried out by a control unit 9. The USB controller 1 has a transmitting unit 8. A signal for confirming the presence or absence of devices is periodically transmitted from the transmitting unit 8 to various devices by the control unit 9.

The USB controller 1 is connected by using the USB port 2a of the personal computer main unit 2 and a USB interface cable 6. Further, a switch part is is provided in the USB controller 1 at some midpoint in the interface cable 6. The switch part is comprises a switch 3a on the data line D+ side and a switch 3b on the data line D− side, thereby interrupting or connecting the data lines between the personal computer main unit 2 and the USB controller 1 by the control unit 9. The switches 3a and 3b are usually held to be ON.

For example, as shown in FIG. 2, when a new device X is added in a state where data is transmitted and received between devices 1 and 2 and the USB controller 1, the device X receives the periodic confirmation signal from the transmitting unit 8 and transmits a response signal to the controller 1. Consequently, the control unit 9 recognizes addition of the new device and either data line 6a or 6b is interrupted. Device information of the newly connected device X and the existing devices 1 and 2, for example, identification data and the like of the devices 1, 2, and X allocated by the control unit 9 is collected and transmitted to the personal computer main unit 2. The personal computer main unit 2 recognizes that the three kinds of the devices 1, 2, and X are connected and all of the devices can be made usable simultaneously.

That is, in the above-described case, either the switch 3a or 3b is turned off and the data line 6a or 6b is interrupted. In this case, by being interrupted, the D+ (or D−) pin switches to a pull-down (switch-off) state and the personal computer main unit 2 recognizes that no device is connected. Then, the D+ (or D−) pin switches to a pulled-up (switch-on) state and the personal computer main unit 2.

According to the USB standard, two transfer speeds of 1.5 MB/bps and 12 MB/bps are supported and are properly used according to the kind of a device. When a device is connected to the USB port 2a, speed information of the device is automatically sent to the personal computer main unit 2 side via the D+ data line 6a or the D− data line 6b and the transfer speed is determined. The transfer speed can be properly switched and used.

FIG. 3 shows a modification of a switch part 10s in a USB controller 10 of the invention.

The data lines 6a and 6b in the interface cable 6 connecting the USB controller 10 and the personal computer main unit 2 are branched midways for the switch part 10s and an earthing part 3c is formed ahead of the branched data lines. Switches 3a and 3b are provided between the interface cable 6 and the earthing part 3c. Usually, the switches 3a and 3b are held in a state where the circuit is interrupted.

In case of the USB controller 10 as well, in a manner similar to the controller 1, for example, when a new device is connected, the connection of the new device is recognized by the USB controller 10 and either the data line 6a or 6b is interrupted. The data line 6a or 6b is interrupted in such a manner that the switch 3*a* or 3*b* is controlled by the control unit 9 provided near the earthing part (i.e. ground, 3*c* and the circuit is closed (connected). In this instance, on the personal computer main unit 2 side, it is recognized that the D+ pin or the D– pin in the USB port 2*a* is pulled down. Immediately after that, the circuit is opened (interrupted) by controlling the switch 3*a* or 3*b* by the control unit 9, so that the data line 6*a* or 6*b* is connected again and information obtained by adding information of the new device to the connection information of an existing device is transmitted to the personal computer main unit 2. As a result, the personal computer main unit 2 recognizes that the new device is connected and all of the connected devices are made usable. An unnecessary device is eliminated.

As mentioned above, in each of the USB controllers 1 and 10 of the invention, when a device is added or eliminated, the USB controller 1 (10) recognizes the change and the data line 6*a* (or 6*b*) is interrupted by switching the switch 1*s* (10*s*) provided for the USB controller 1 (10) and is connected again. The connection state of the peripheral devices is confirmed on the USB controller 1 (10) side and the information is transmitted to the personal computer main unit 2 on the host side. As a result, the newly connected device can be made usable immediately and the elimination of the device is recognized by the personal computer main unit.

As mentioned above, the USB controllers of the invention are not limited by the foregoing embodiments but can be variously changed without departing from the spirit of the invention. For example, the switch can be provided outside of the USB controller and manually operated.

As a device to which the invention is applied, although that of a wireless type is preferable, a wireless device and a wired device can be also mixedly used. In this case, a plurality of USB ports are formed on the USB controller side and a cable of the wired device is connected to one of the USB ports, thereby enabling the devices to be immediately used upon connection.

When a new device is added and the OS of the personal computer is not adapted to the device, by newly installing a driver for the device to the personal computer, the OS can be adapted to the device.

In the USB controller of the invention, even when a new device is added or an existing device is eliminated, the connection state of the devices can be updated without requiring the pull-out and insertion of the connector or resetting of the system. Especially, when the device is wireless, the USB controller has an advantage that the device can be immediately used only by arranging the device in a predetermined position.

What is claimed is:

1. A universal serial bus (USB) controller connected to a port according to a USB standard provided for a main unit of a computer, transmits and receives data wirelessly to/from a plurality of various devices, controls data from each of said devices and transmits the data to said computer main unit, said USB controller comprising:

a receiving unit to receive signals from said devices;

a transmitting unit to transmit a confirmation signal;

a control unit to control said receiving unit and said transmitting unit; and a switch disposed between the computer main unit and the transmitting unit, devices being recognized after switching of said switch, said switch switched on the basis of said confirmation signal and controlling a connection between the computer main unit and the control unit in accordance with a change in a number of the plurality of devices.

2. The USB controller according to claim 1, wherein said control unit determines identification data of a new device added to the plurality of devices and transmits the identification data to said computer main unit, and the computer main unit selects one device of the plurality of devices on the basis of the identification data.

3. The USB controller according to claim 1, the switch disposed between the computer main unit and the controller.

4. The USB controller according to claim 3, wherein said control unit determines identification data of a new device added to the plurality of devices and transmits the identification data to said computer main unit, and the computer main unit selects one device of the plurality of devices on the basis of the identification data.

5. A universal serial bus (USB) controller connected to a port according to a USB standard provided for a main unit of a computer, transmits and receives data wirelessly to/from a plurality of various devices, controls data from each of said devices and transmits the data to said computer main unit, said USB controller comprising:

a receiving unit to receive signals from said devices;

a transmitting unit to transmit a confirmation signal;

a control unit to control said receiving unit and said transmitting unit; and a switch connecting ground and a data line between the computer main unit and the controller, devices being recognized after switching of said switch, said switch switched on the basis of said confirmation signal and controlling the connection in accordance with a change in a number of the plurality of devices.

6. The USB controller according to claim 5, wherein said control unit determines identification data of a new device added to the plurality of devices and transmits the identification data to said computer main unit, and the computer main unit selects one device of the plurality of devices on the basis of the identification data.

* * * * *

UNITED STATES PATENT AND TRADEMARK OFFICE
CERTIFICATE OF CORRECTION

PATENT NO. : 6,205,502 B1
DATED : March 20, 2001
INVENTOR(S) : Yoshihisa Endo et al.

It is certified that error appears in the above-identified patent and that said Letters Patent is hereby corrected as shown below:

<u>Title page,</u>
Item [73], delete "Tolyo" and substitute -- Tokyo -- in its place.

Signed and Sealed this

Twenty-sixth Day of February, 2002

Attest:

Attesting Officer

JAMES E. ROGAN
Director of the United States Patent and Trademark Office